March 19, 1963 H. D. BRAUN 3,081,834
UNIT WEIGHT MECHANISM FOR WEIGHING SCALES
Filed Oct. 27, 1959 7 Sheets-Sheet 2
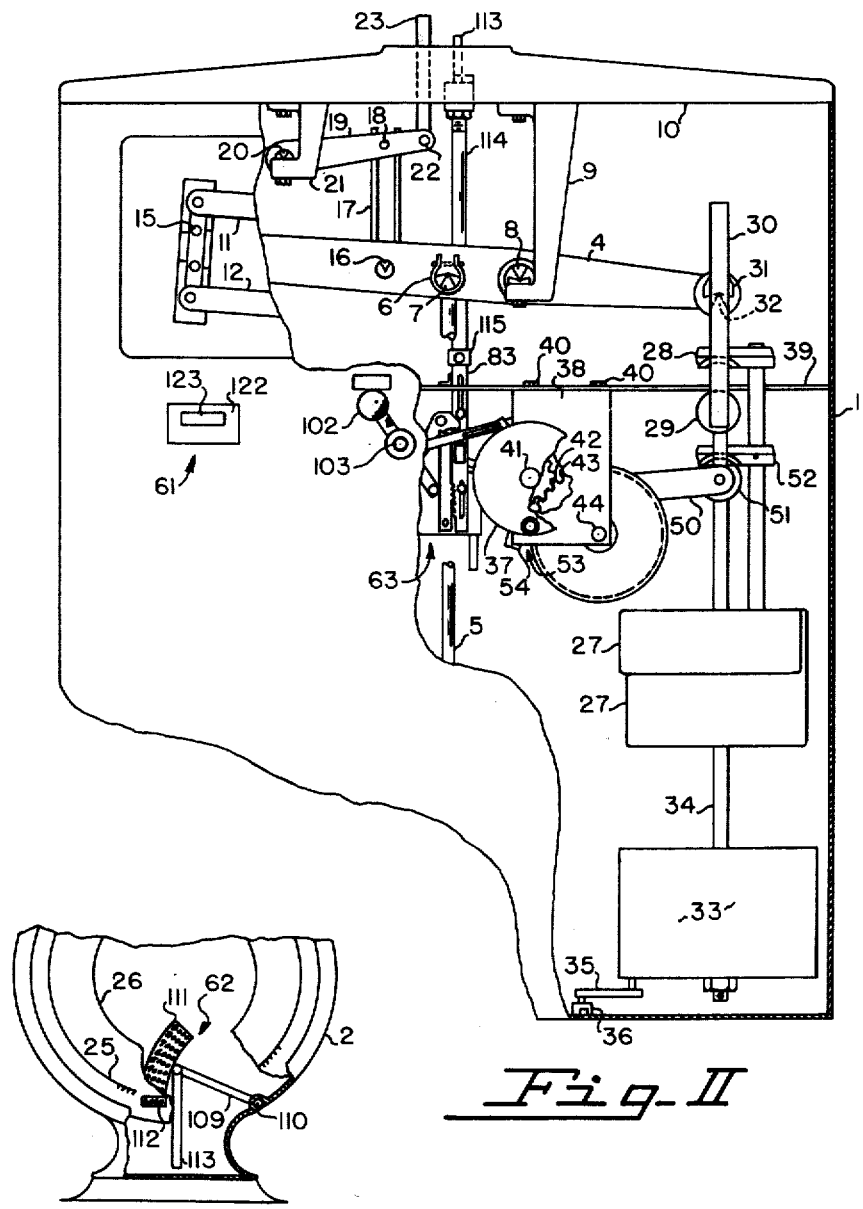
Fig. II
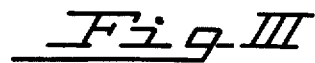
Fig. III
INVENTOR.
HERBERT D. BRAUN
BY
Marshall, Marshall & Yeasting
ATTORNEYS

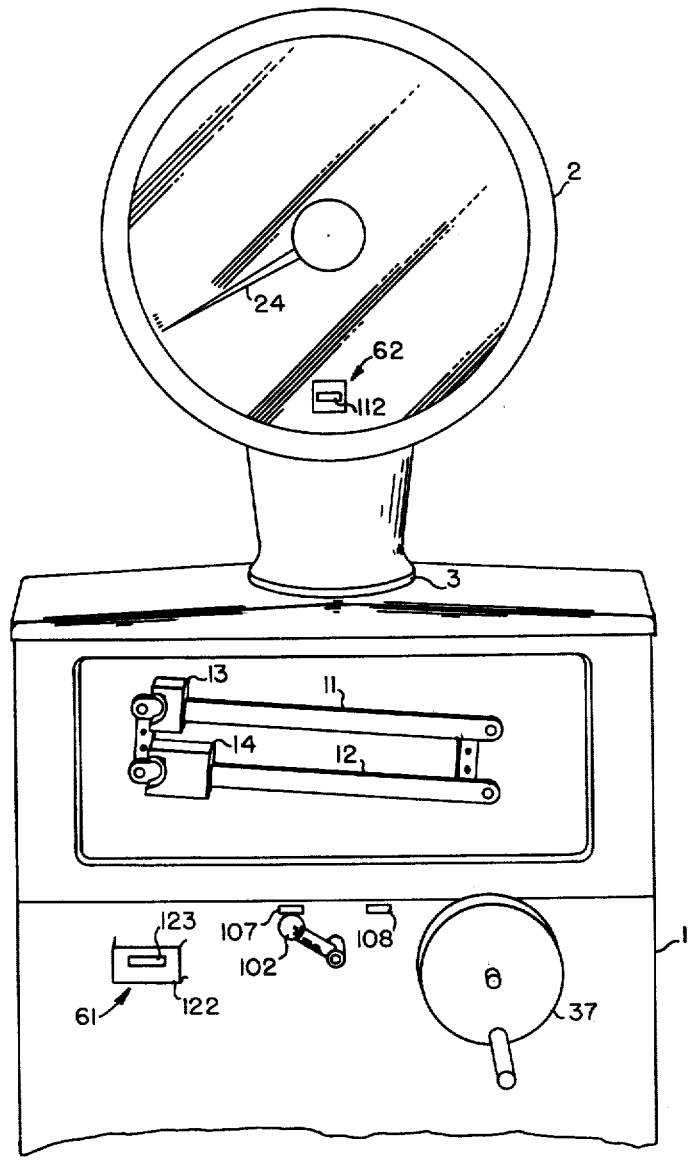
Fig. I

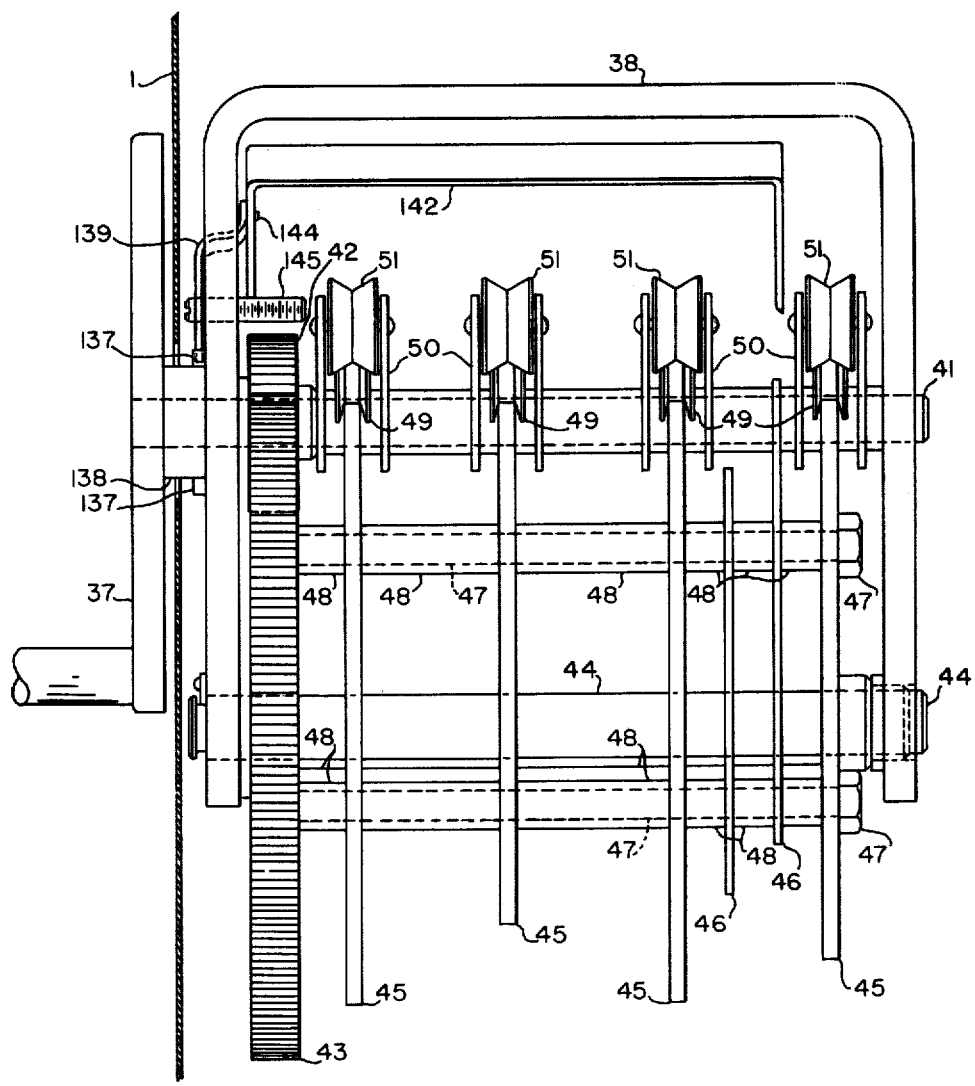

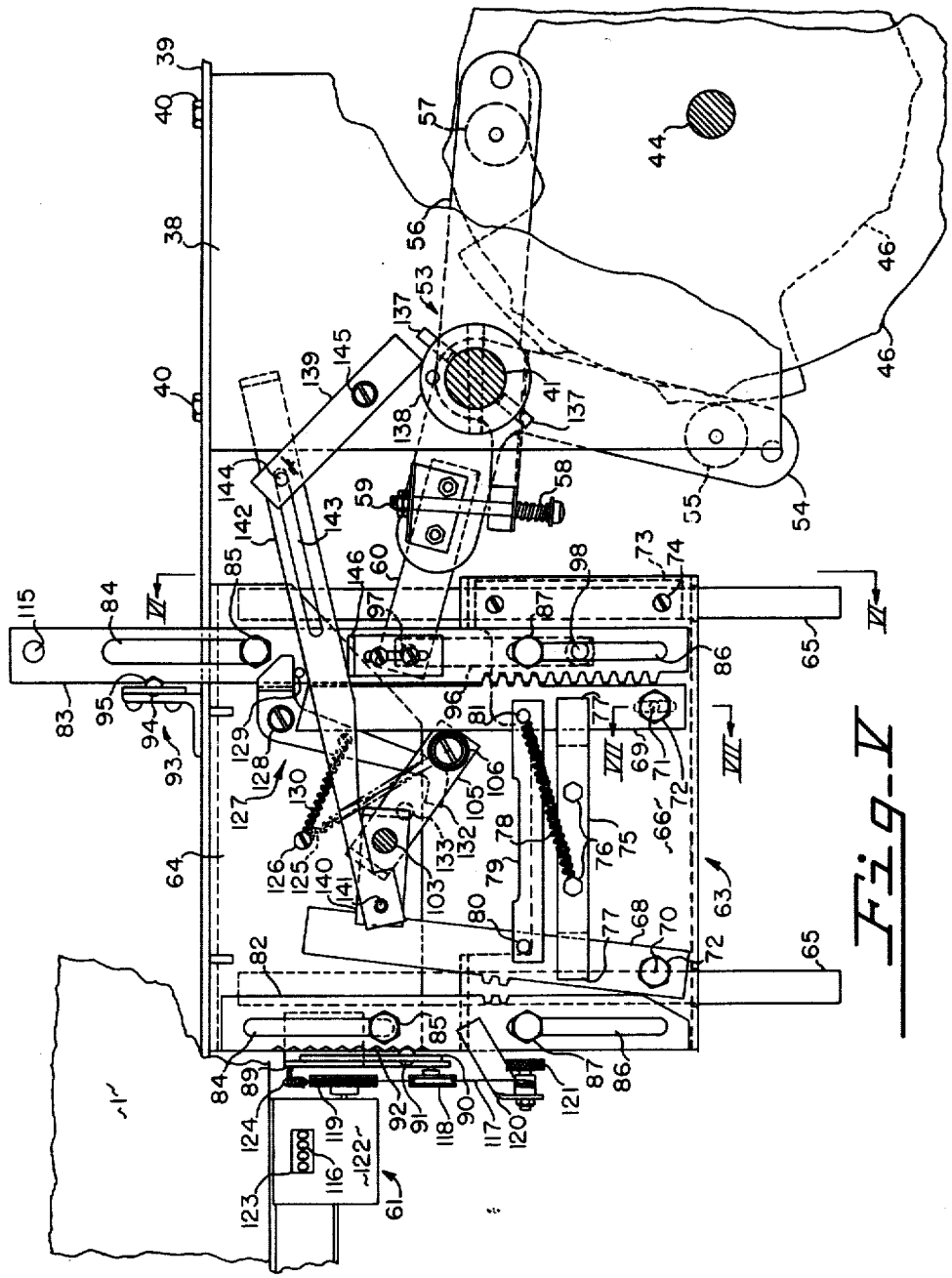

March 19, 1963 H. D. BRAUN 3,081,834
UNIT WEIGHT MECHANISM FOR WEIGHING SCALES
Filed Oct. 27, 1959 7 Sheets-Sheet 5
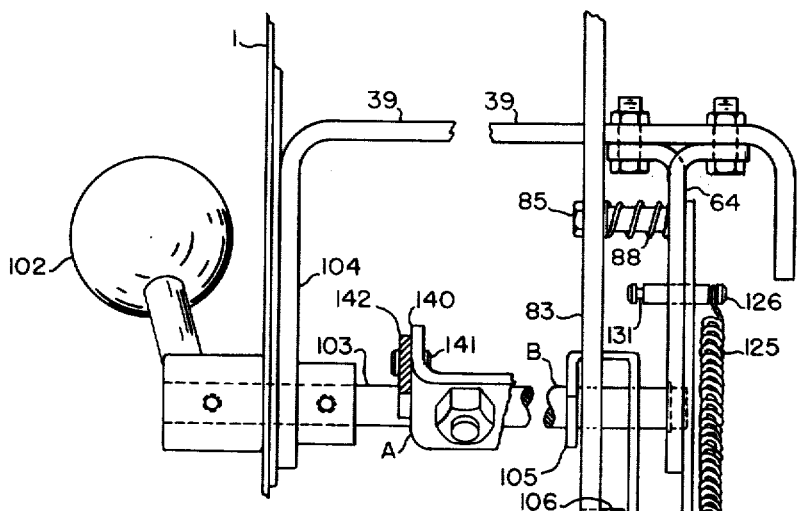
Fig. VI
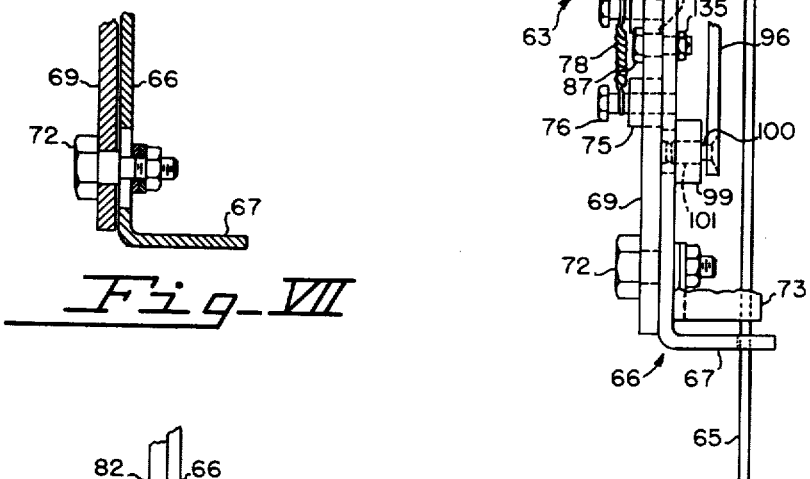
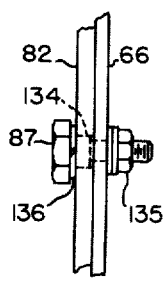
Fig. VII
Fig. VIII
INVENTOR.
HERBERT D. BRAUN
BY
Marshall, Marshall & Yeasting
ATTORNEYS March 19, 1963 H. D. BRAUN 3,081,834
UNIT WEIGHT MECHANISM FOR WEIGHING SCALES
Filed Oct. 27, 1959 7 Sheets-Sheet 6
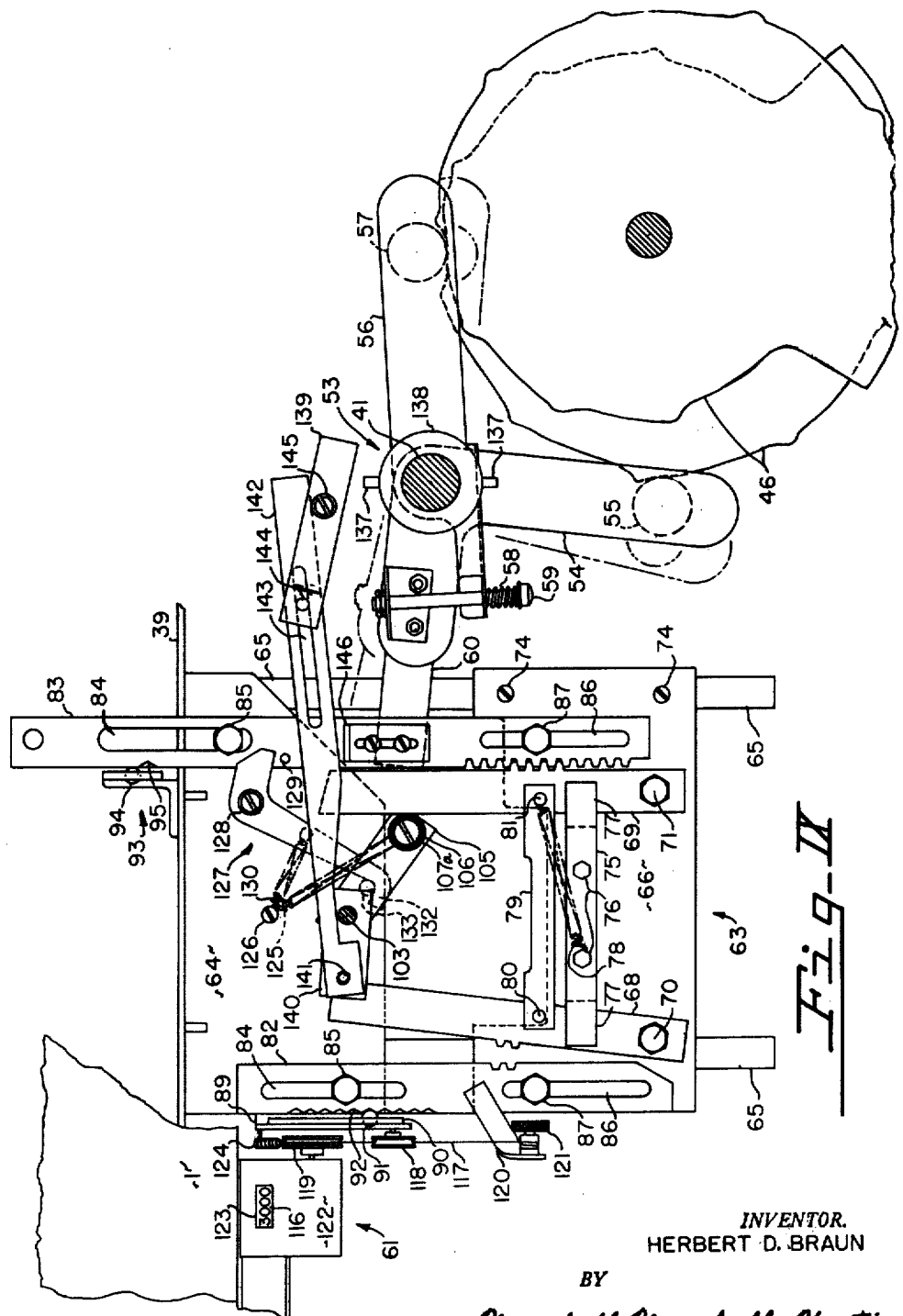
INVENTOR.
HERBERT D. BRAUN
BY
Marshall, Marshall & Yeasting
ATTORNEYS

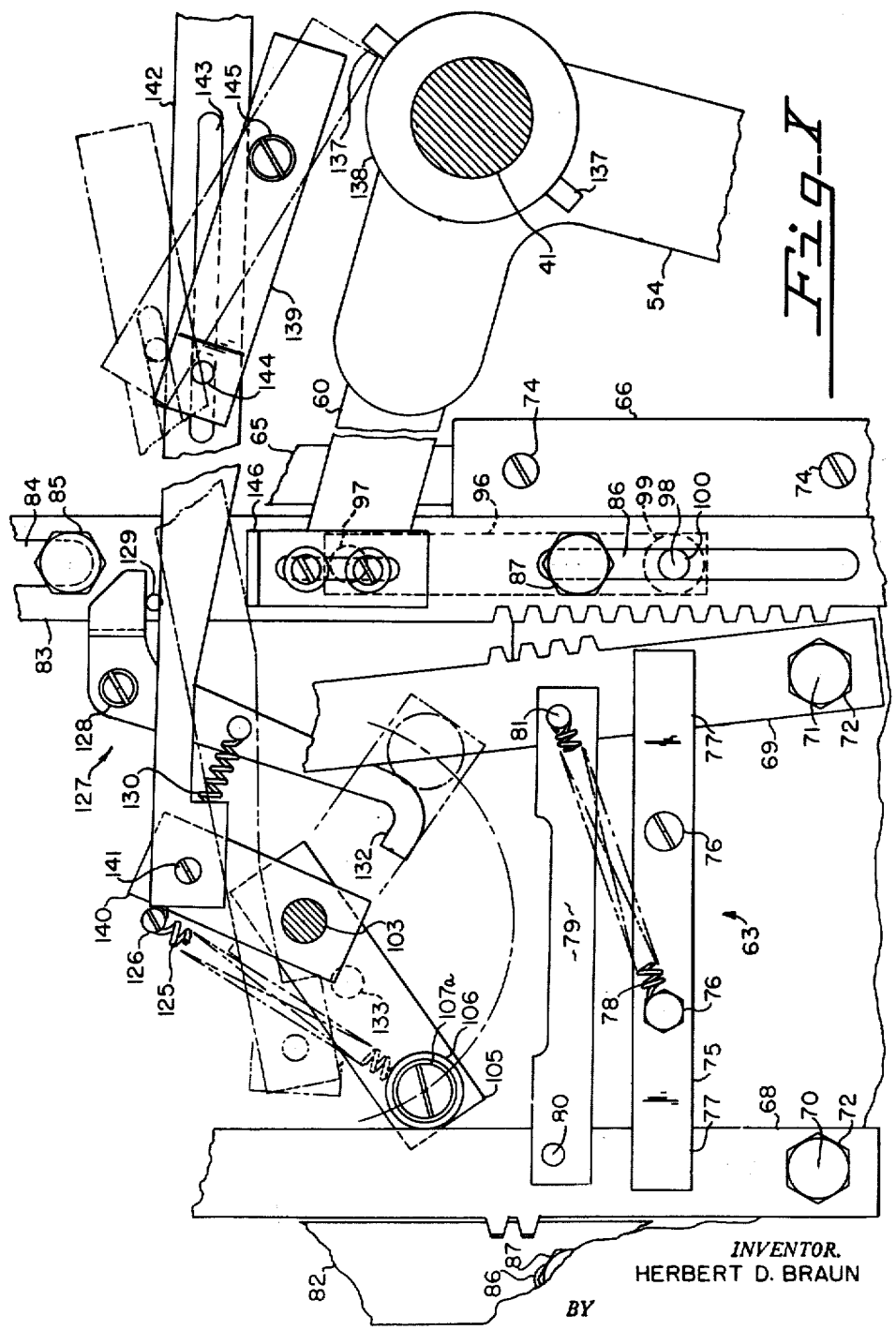

United States Patent Office 3,081,834
Patented Mar. 19, 1963

3,081,834
UNIT WEIGHT MECHANISM FOR WEIGHING SCALES
Herbert D. Braun, Toledo, Ohio, assignor to Toledo Scale Corporation, Toledo, Ohio, a corporation of Ohio
Filed Oct. 27, 1959, Ser. No. 849,018
17 Claims. (Cl. 177—176)

This invention relates generally to weighing scales, and more particularly to scales which are provided with mechanical "unit weights" for increasing the load offsetting capacity.

Many weighing scales are constructed which incorporate additional so-called "unit weights" for increasing the load offsetting capacity of the scale without decreasing the sensitivity of indication given by the main scale indicator. This is usually accomplished by means of manually positionable unit weights which are placed on the weighing scale mechanism, one at a time, and each of which increases the capacity of the scale by some fixed amount, e.g., 500 or 1000 pounds. In scales so equipped, the unit weights may counterbalance as much as four-fifths or more of the total weighing capacity of the scale, the remaining one-fifth being counterbalanced by ordinary automatic load counterbalancing mechanism and indicated by the regular scale indicator attached thereto. The indication of the increased weighing capacity of the scale, that achieved by the unit weights, may be in the form of small flags which state the amount to be added to the indication to give the total weight of the load on the scale. Unit weight operating mechanism is manipulated to place one or more unit weights into cooperative relation with the automatic load counterbalancing mechanism when a load is on the platform which exceeds the automatic counterbalancing capacity as indicated by the chart.

Usually, such unit weights are used to offset net load only, any tare being offset by the usual poise weights on an ordinary tare beam. This arrangement, however, is not satisfactory when the tare weight is large relative to the net weight, e.g., a loaded tow-motor truck which may have a tare weight in excess of the capacity of the tare beam and its poise weights. U.S. Patent No. 2,851,262 issued on September 9, 1958 to Frederic E. Hoffmanns shows and describes, in a weighing scale, means for permitting the selective use of ordinary unit weights either to offset tare or to offset net load or both. The unit weight mechanism of the invention is an improvement upon the unit weight mechanism which is shown and described in the foregoing patent.

According to the general features of the unit weight mechanism which is shown and described in the foregoing patent, there is provided a pair of unit weight indicating devices selectively coupled to the usual unit weight loaded tow-motor trucks or other objects having a tare operating mechanism of a weighing scale. The devices are especially useful in connection with the weighing of loaded tow-motor trucks or other objects having a tare weight which is large relative to net weight.

In operation, for example, if an empty truck weighs 2400 pounds, the operator may use unit weights to tare off 2000 pounds and the regular poise weights to tare off the remaining 400 pounds. One of the new unit weight indicating devices will then indicate 2000 pounds tare offset by unit weights. The operator then may manipulate a conditioning lever on the front of the weighing scale, whereupon he may offset 7000 pounds of net load by the remaining unit weights in the usual manner. In addition to the part of the net load counterbalanced by the usual automatic load counterbalancing mechanism, such as springs or pendulums, the two unit weight indicating devices will then read:

"Add 2000 lb." to the tare shown on the tare beam.
"Add 7000 lb." to the net load shown on the dial.

It was found that, although the foregoing conditioning lever which is used to select the particular use to which the unit weights were to be put tended to stay under spring force in one or the other of its two operative positions, sometimes the scale operator leaned on the handle of the conditioning lever and inadvertently moved it between its two operative positions. This caused both of the unit weight indicating devices to become uncoupled at the same time from the unit weight operating mechanism, and as a result a unit weight could be added or removed without effecting a change in either one of the unit weight indications.

It also was found that when all of the unit weights were removed from net load offsetting use and it was time for the scale operator to manipulate the foregoing conditioning lever so that unit weights could be removed from tare offsetting use, the operator might inadvertently continue to turn the handle of the unit weight operating mechanism without manipulating the conditioning lever. Because of the mechanical advantage through the gearing and leverage of the unit weight operating mechanism, the operator could and sometimes did smash the drive which connected such mechanism to the unit weight indicating devices if he failed to manipulate the conditioning lever at the proper time.

It is, accordingly, the principal object of this invention to provide, in a weighing scale, improved means, which obviates the foregoing difficulties, for permitting the selective use of ordinary unit weights either to offset tare or to offset net load or both.

Another object of the invention is to provide, in a weighing scale having unit weights for increasing the load offsetting capacity of the scale, unit weight operating mechanism and a pair of unit weight indicating devices selectively coupled to the unit weight operating mechanism, one of the devices indicating the amount of tare offset by unit weights and the other of the devices indicating the amount of net load offset by further unit weights or optionally one of the devices indicating the gross amount of tare and net load offset by unit weights and the other of the devices indicating the amount of net load offset by unit weights, means for keeping one or the other of such indicating devices operatively connected to the unit weight operating mechanism to prevent the addition or the removal of a unit weight without effecting a change in either one of the unit weight indications.

A further object of the invention is to provide, in a weighing scale having unit weights for increasing the load offsetting capacity of the scale, unit weight operating mechanism and a pair of unit weight indicating devices selectively coupled to the unit weight operating mechanism, one of the devices indicating the amount of tare offset by unit weights and the other of the devices indicating the amount of net load offset by further unit weights or optionally one of the devices indicating the gross amount of tare and net load offset by unit weights and the other of the devices indicating the amount of net load offset by unit weights, lock means for the unit weight operating mechanism to prevent its operation during the removal of unit weights should the respective unit weight indicating devices not be properly coupled to and uncoupled from the unit weight operating mechanism.

More specific objects and advantages are apparent from the following description of a specific embodiment of the invention.

According to the invention, the unit weight mechanism for weighing scales which is shown and described in the foregoing patent is provided with an improved drive for the unit weight indicating devices which, when the conditioning lever that is used to select the particular use to which the unit weights are to be put is inadvertently moved out of operative position, fails safe in that a spring and linkage automatically engage the drive with one of the indicating devices so that one or the other of such devices always is operatively connected to the unit weight operating mechanism and is further provided with a safety lock for the unit weight operating mechanism which is automatically actuated when all of the unit weights are removed from net load offsetting use and it is time for the scale operator to throw the conditioning lever into its tare position. The operator cannot operate the unit weight operating mechanism until he properly manipulates the conditioning lever. After he properly manipulates the lever, the lock automatically releases the unit weight operating mechanism and he is free to operate the mechanism to remove the rest of the unit weights.

The invention may be more readily understood from the following detailed description of a specific embodiment in which description reference is made to the accompanying drawings:

In the drawings:

FIG. I is a perspective view of the upper part of a unit weight cabinet and the dial housing of a weighing scale embodying the invention;

FIG. II is a front elevational view of the unit weight cabinet shown in FIG. I, parts of the cabinet being broken away and parts being shown in section to reveal the interior;

FIG. III is a reduced front elevational view of the dial housing shown in FIG. I, parts of the housing being broken away;

FIG. IV is an enlarged side elevational view of the unit weight operating mechanism shown in FIG. II;

FIG. V is an enlarged elevational view of part of the interior of the unit weight cabinet shown in FIG. II;

FIG. VI is an enlarged, fragmentary end elevational view as seen from line VI—VI of FIG. V;

FIG. VII is an enlarged vertical sectional view taken along line VII—VII of FIG. V;

FIG. VIII is a fragmentary elevational view of a modified form of the apparatus shown in FIG. VI;

FIG. IX is an elevational view which corresponds to FIG. V showing the parts in another operating position; and FIG. X is an enlarged, fragmentary elevational view which corresponds to FIG. IX showing the parts in still another operating position.

These specific drawings and the accompanying description are intended merely to illustrate the invention but not to limit its scope.

A weighing scale embodying the invention includes a frame in the form of a cabinet 1 surmounted by a dial housing 2 erected on a housing base 3. A load receiving mechanism (not shown) is provided which includes the usual load supporting levers and load receiving platform. The load moment is transmitted to a tare beam lever 4 through a suitable stirrup on the nose of the load supporting levers through a rod 5, suspended by means of a stirrup 6 from laterally extending pivots 7 in the tare beam lever 4, which, by means of fulcrum pivots 8, is rockably mounted upon a fulcrum stand 9 fixedly hung from a ceiling 10 in the interior of the cabinet 1. The tare beam lever 4 carries tare beams 11 and 12, with their poises 13 and 14, bolted to projecting arms 15 which beams and cooperating poises serve to offset tare weights. The cabinet 1 is usually mounted adjacent the load receiving platform in such a position that the depending rod 5 is vertically positioned to engage the aforementioned stirrup in the nose of the load supporting lever system. Although an extension lever may be interposed between the nose end and the rod 5 the length of such extension lever is necessarily limited.

Load forces to be counterbalanced are transmitted from the tare beam lever 4 through a power pivot 16 and connecting linkage 17 to a load pivot 18 of a second lever 19, which, by means of fulcrum pivots 20, is rockably mounted upon a fulcrum bracket 21 fixedly hung from the ceiling 10 of the cabinet 1. The second lever 19 has a power pivot 22 engaging a bearing at the lower end of a steelyard rod 23 that extends upwardly into the dial housing 2 and is connected to automatic load counterbalancing mechanism enclosed within the dial housing 2. An indicator 24 cooperates with a series of indicia 25 marked on the exposed face of a chart 26 to indicate the weights of loads.

Auxiliary load counterbalancing mechanism is also provided in the weighing scale. This comprises a plurality of individual unit weights 27 having first hooked portions 28 which may be successively and individually hooked over a hanger bar 29 secured to the lower ends of plates 30 whose upper ends are provided with V-bearings 31 which are supported upon laterally extending pivots 32 in the tare beam 4 on the opposite side of the fulcrum point of the tare beam 4 from the connection between the rod 5 and the tare beam. The hanger bar 29 has a plurality of annular V-shaped grooves one for each of the first hooked portions 28 of the manually applied unit weights 27. For counterbalancing the dead weight of the load receiving platform and the lever system, not counterbalanced by the load counterbalancing mechanism when in initial position, a hollow chamber 33, suspended by means of a rod 34 rigidly attached to the hanger bar 29, is provided for the reception of lead or other counterbalancing material. Swinging motion, or oscillation of the chamber 33 about its suspension point on the hanger bar 29, is prevented by a check link 35 whose ends pivotally engage the chamber 33 and a fulcrum stand 36 which is mounted upon the bottom of the cabinet 1.

Unit weight operating mechanism is provided so that the unit weights 27 may be manually applied to or taken from the hanger bar 29 by manipulation of a handle 37 located on the outside of the cabinet 1. Each time the handle 37 is turned clockwise 180 degrees the capacity of the scale is increased by a fixed amount equal to the capacity of the chart 26. Although only four unit weights 27 are provided, the weights are applied in combinations to provide nine increases to the capacity of the scale, each increase equal to the capacity of the chart 26. Each time the handle 37 is turned counterclockwise 180 degrees the capacity of the scale is decreased by a fixed amount equal to the capacity of the chart 26.

The unit weight operating mechanism is hung as a unit by means of a U-shaped bracket 38 attached to a shelf 39 within the cabinet 1. Removal of nuts 40 allows the bracket 38 carrying all of the unit weight operating mechanism to be taken out of the cabinet 1. The unit weight operating mechanism includes the handle 37 fixed to a shaft 41 (FIG. IV) journaled in the bracket 38 and a pinion 42 also fixed to the shaft 41 which pinion cooperates with a gear 43 fixed to a shaft 44 journaled in the bracket 38. When the handle is turned and the pinion 42 drives the gear 43, lifting cams 45 and flash drive cams 46 rigidly attached to the gear 43 by means of bolts 47 threaded into the gear 43 turn in response. The cams 45 and 46 are separated from the gear 43 and from each other by separators 48, the shaft 44 to which the gear 43 is attached passing through a hole cut in each cam.

When the lifting cams 45 are turned, their cooperating follower wheels 49 drive lifting arms 50 rotatably pivoted to the shaft 41, which arms 50 have lifting pulleys 51 attached to the ends of the arms 50 remote from the follower wheels 49. The lifting pulleys 51 cooperate with second hooked portions 52 (FIG. II) of the unit weights 27 to move the first hooked portions 28 of the unit weights from or onto the hanger bar 29. The unit weights 27 are applied in combinations to provide nine increases to the capacity of the scale, each increase equal to the capacity of the chart 26 and each increase provided by a 180 degree clockwise turn of the handle 37.

As the lifting cams 45 are turned, the flash drive cams 46 are also turned to drive a follower 53 pivoted to the shaft 41. The flash drive cams 46 are identically shaped, inversely mounted, and rigidly connected, as shown in detail in FIG. V of U.S. Patent No. 2,724,585, issued to R. O. Bradley and C. H. Maurice, Jr., on November 22, 1955. The follower 53 includes an L-shaped bell crank 54 formed of two identically shaped spaced apart pieces pivoted side by side to the shaft 41 which bell crank 54 carries a roller 55 following one of the flash drive cams 46, and an arm 56 also formed of two identically shaped spaced apart pieces pivoted side by side to the shaft 41 which arm 56 carries a roller 57 following the other flash drive cam 46. The bell crank 54 and the arm 56 cross like the arms of scissors and are squeezed together like the arms of scissors by means of a compression spring 58 attached to a bolt 59 joining the bell crank 54 and the arm 56 causing the bell crank and the arm to press the rollers 55 and 57 into constant yet flexible contact with their respective flash drive cams 46. A bar 60 is rigidly sandwiched between the spaced apart pieces forming the bell crank 54 and extends beyond the bell crank. This construction provides a fail safe, positive drive for the bar 60, i.e., no return means independent of the flash drive cams 46, such as a spring return, is used. The flash drive cams 46 are shaped and positioned to positively drive the bar 60 downward as unit weights are placed by the unit weight lifting mechanism onto the hanger bar 29 and upward as unit weights are removed from the hanger bar 29.

A pair of unit weight indicating devices 61 and 62 is selectively coupled to and driven by the bar 60 of the unit weight operating mechanism, one device 61 indicating the amount of tare offset by unit weights 27 and the other device 62 indicating the amount of net load offset by further unit weights. The unit weight indicating devices 61 and 62 are coupled to the end of the bar 60 by means, generally indicated by the reference numeral 63, for permitting the selective use of the unit weights 27 either to offset tare or to offset net load or both. Such means 63 includes a vertical plate 64 that is fixedly hung from the shelf 39 in the cabinet 1 and that carries a pair of spaced and vertically positioned slide bars 65 rigidly attached thereto. The bars 65 extend well below the bottom of the plate 64 so that there is plenty of room for a slidably mounted plate or slide 66 to move up and down on the bars 65, the slide 66 being in the form of a flat-bottomed U the legs 67 of which have openings which cooperate with the bars. The slide 66 carries a pair of racks 68 and 69 pivotally attached to the slide at 70 and 71, respectively. The pivotal connections between the racks 68 and 69 and the slide 66 are identical and one is shown in detail in FIG. VII which illustrates the bottom of the rack 69 attached to the slide 66 by means of a shoulder screw 72. As viewed in FIG. V, the left hand one of the slide bars 65 is received in the openings in the legs 67 of the slide 66 which fit the bar quite closely at its front and back but which are oversize at the sides of the bar to keep drag along the edges of the bar to a minimum. The right hand one of the slide bars 65 is received in similar openings in the legs 67 of the slide 66; however, such bar 65 cooperates with an angle 73 that is so secured to the slide 66 by means of screws 74 that the angle 73 is horizontally adjustable. The angle 73 is so adjusted that it drags enough along the edge of the bar 65 to take up play. A guide bar 75 secured to the slide 66, by means of screws 76, has ends 77 which are bent out of its plane and which are adjacent the fronts of the racks 68 and 69 to keep the racks aligned. A spring 78 between one of the screws 76 and the rack 69 urges the rack 69 counter-clockwise about the pivot 71 as viewed in FIG. V. A link 79 pivotally connected at 80 and 81 to the racks 68 and 69, respectively, causes the racks 68 and 69 to pivot about their respective pivots 70 and 71 as one.

The stationary plate 64 and the slide 66 are interconnected by means of a second pair of racks 82 and 83 which are slidably mounted. Each of the racks 82 and 83 has an upper slot 84 cooperating with the shoulder of a shoulder screw 85 connected to the stationary plate 64 and each has a lower slot 86 cooperating with the shoulder of a shoulder screw 87 connected to the slide 66. The upper shoulder screws 85 are surrounded by coil springs 88 located between the racks and the plate, one of the springs 88 being shown in FIG. VI urging the rack 83 away from the plate 64. The springs 88 tend to keep the slidably mounted racks 82 and 83 in the positions in which they are put. An angle bracket 89 is fixed to the stationary plate 64 and it supports a detent plate 90 which urges a ball 91 into detent notches 92 along the edge of the rack 82. The ball detent helps the spring 88 keep the rack 82 in the position in which it is put. A second ball detent 93 (FIG. V) which is carried by the shelf 39 has a ball 94 that is received in an edge notch 95 in the rack 83 when no unit weights are being used for net load offsetting to insure zero net load indication at such time.

The end of the bar 60, which is driven downward by the flash drive cams 46 as unit weights 27 are placed by the unit weight operating mechanism onto the hanger bar 29 and upward as unit weights are removed from the hanger bar, is connected to the slide 66 by means of a link 96 pinned to the bar 60 at 97 (FIG. V) and to the slide 66 at 98. The pin connections at 97 and 98 are similar and the lower one 98 is illustrated in detail in FIG. VI which shows a ring 99 fixed to the slide 66 and a pin 100 fixed to the lower end of the link 96, the pin cooperating with an opening 101 in the ring. The slide 66 is, thus, operatively and permanently connected to the unit weight operating mechanism and positioned thereby.

The slide 66, moved up and down by the bar 60, carries the pivotally attached pair of racks 68 and 69 up and down and these racks may be selectively coupled with the slidably mounted racks 82 and 83 to drive up or down that one of the racks 82 and 83 which happens to be so coupled. The unit weight indicating device 62 is driven by the rack 83 and the unit weight indicating device 61 is driven by the rack 82, as will be hereinafter described. The pivotal racks 68 and 69 are selectively coupled to the slidable racks 82 and 83 by means including a conditioning lever 102 that is located on the outside of the cabinet 1 and that is mounted on a shaft 103 journaled in a leg 104 of the shelf 39 and in the stationary plate 64. The end of the shaft 103 remote from the lever 102 carries a bracket 105 fixed thereto by means of a set screw and a nut, as shown in FIG. VII in the foregoing U.S. Patent No. 2,851,262, and the bracket in turn carries a wheel 106 turning on the shoulder of a shoulder screw 107a mounted through the bracket.

The wheel 106 contacts the upper end of the pivotally mounted rack 69 when the conditioning lever 102 is moved to "Weigh" position indicated at 107 in FIG. I. Contact of the wheel 106 with the rack 69 pivots the rack about the pivot point 71 and meshes it with the slidably mounted rack 83. The wheel 106 contacts the upper end of the pivotally mounted rack 68 when the conditioning lever 102 is moved to "Tare" position indicated at 108 in FIG. I.

The unit weight indicating device 62 includes an arm 109 (FIG. III) pivoted at 110 in the dial housing 2. The opposite end of the arm 109 is provided with a flag 111 bearing a series of numerals which represent net weight values offset by unit weights 27. The flag 111 is positioned immediately in back of the chart 26 so that one of the series of numerals thereon is visible in an opening 112 in the chart. Appropriate lettering adjacent the opening 112, e.g., Add-Lbs., serve to call the attention of the operator to the fact that the amount represented by the figures appearing in the opening must be added to the amount indicated by the indicator 24 on the chart 26. The arm 109 is pivotally connected to a rod 113 extending downwardly within the cabinet 1 and the rod 113 is coupled to a rod 114 (FIG. II) larger in diameter coupled in turn at 115 to the slidably mounted rack 83.

The unit weight indicating device 61 includes a drum 116 bearing a series of numerals which may represent tare values offset by unit weights 27. The drum 116 is mounted for rotation as shown in the foregoing U.S. Patent No. 2,851,262 and is driven by a cord drive which includes a cable 117 running over an idler 118 and a drive pulley 119 to which the drum 116 is attached. One end of the cable 117 is resiliently fastened to the bracket 89 fixed to the stationary plate 64 and the other end is fastened to a bracket 120 carried by the slidably mounted rack 82 by means of a zero adjusting thumb screw 121. The drum 116 is positioned immediately in back of a cover 122 so that one of the series of numerals thereon is visible in an opening 123 in the cover. Appropriate lettering adjacent the opening 123, e.g., Add-Lbs., serves to call the attention of the operator to the fact that the amount represented by the figures appearing in the opening must be added to the amount indicated by the poise weights 13 and 14 on the tare beams 11 and 12. Zero adjustment of the drum 116 is effected by turning the thumb screw 121 which pulls the cable 117 and extends a coil spring 124 that connects the cable to the bracket 89. This turns the drum 116 so that it may indicate zero when none of the unit weights 27 are being used for offsetting tare.

In the operation of the device, for example, if an empty truck weighs 2400 pounds, the operator manipulates the conditioning lever 102 into "Tare" position indicated at 108 in FIG. I. A coil spring 125 connected between the shoulder screw 107a carried by the bracket 105 fixed to the shaft 103 and a pin 126 fixed to the stationary plate 64 tends to maintain the conditioning lever 102 in the position to which it is moved. The wheel 106 carried by the bracket 105 then holds the pivotally mounted rack 68 in engagement with the slidably mounted rack 82, the racks 68 and 82 being engaged under the action of the spring 78 and link 79 before the wheel 106 reaches the rack 68. This couples the rack 82 with the slide 66.

The operator then may use unit weights 27 to tare off 2000 pounds by cranking the handle 37 clockwise 360 degrees. Each time the handle 37 is turned clockwise 180 degrees the capacity of the scale is increased by a fixed amount equal to the capacity of the chart 26, which for the purpose of illustration is 1000 pounds. The operator may use the regular poise weights 13 and 14 to tare off the remaining 400 pounds. Each time the handle 37 is turned clockwise, the end of the bar 60, link connected with the slide 66, drives the slide and the slidable rack 82, now coupled to the slide, downward causing the cable 117 to turn the tare drum 116 which then displays the numerals "2000" in the opening 123 in the cover 122. When the conditioning lever 102 was moved to "Tare" position 108, the wheel 106 moved away from the pivotally mounted rack 69 which was then urged out of engagement with the slidable rack 83 by the spring 78 so that the downward movement of the slide 66 had no effect on the rack 83, the shoulder screw 87 merely moving downward in the slot 86 in the rack 83. In this stage of the weighing cycle, the unit weight indicating device 62 indicates zero. When the pivotally mounted rack 69 was moved out of engagement with the slidable rack 83 by means of the spring 78, the link 79 which connects the pivotally mounted racks 68 and 69 pivoted the rack 68 counterclockwise about its pivot 70 and engaged the rack 68 with the slidably mounted rack 82, the wheel 106 helping to hold the racks 68 and 82 in engagement after it reaches the rack 68.

One of the features of the unit weight mechanism is in the spring 78 and the link 79 which together are means for keeping one or the other of the pivotal racks 68 and 69 engaged with its respective slidable rack even though the wheel 106 is out of engagement with a pivotal rack and, hence, for keeping one or the other of the indicating devices 61 and 62 operatively connected to the unit weight operating mechanism to prevent the addition or the removal of a unit weight without effecting a change in either one of the unit weight indications. Heretofore, when the scale operator leaned on the conditioning lever 102 and inadvertently moved it between its two operative positions which positioned the wheel 106 somewhere between the pivotal racks 68 and 69 and not in engagement with either one of such racks, both of the pivotal racks 68 and 69 became disengaged from their respective slidable racks 82 and 83 and as a result a unit weight could be added or removed without effecting a change in either one of the unit weight indications. The spring 78, however, as soon as the wheel 106 moves away from the pivotal rack 69 urges the pivotal rack 69 counterclockwise about its pivot 71 as viewed in FIG. V and drives the pivotal rack 68, link connected to the pivotal rack 69, into engagement with the slidable rack 82. Should the wheel 106 be moved in the other direction, i.e., away from the pivotal rack 68, the pivotal rack 68 is maintained in engagement with the slidable rack 82 by the force of the spring 78.

The operator then may manipulate the conditioning lever 102 into "Weigh" position indicated at 107 in FIG. I. This positions the wheel 106, as shown in FIG. V, against the pivotally mounted rack 69 and away from the pivotally mounted rack 68. The rack 68 is then pulled by the link 79 out of engagement with its cooperating rack 82 and the rack 69 is then meshed with its cooperating rack 83. Further movement of the slide 66 has no effect on the rack 82 and the unit weight indicating device 61 driven thereby, the shoulder screw 87 merely moving in the slot 86 in the rack 82. It is to be understood that, when the racks 82 or 83 are driven by the slide 66, the slots 84 in the racks move relative to the shoulder screws 85, the coil springs 88 holding the racks 82 and 83 in place when such racks are uncoupled from the driving racks 68 and 69.

The operator then may use the remaining unit weights 27 to offset 7000 pounds of net load by further cranking the handle 37 clockwise. Each 180 degree clockwise turn of the handle 37 causes the bar 60 to drive the slide 66 and the slidable rack 83, now coupled to the slide, downward one step causing the flag 111 operatively and permanently connected to the rack 83 to move downward and, after seven 180 degree turns, display "7000" in the opening 112 in the chart 26. In addition to the part of the net load counterbalanced by the usual automatic load counterbalancing mechanism, such as springs or pendulums, the two unit weight indicating devices 61 and 62 will then read, respectively:

"Add 2000 lb." to the tare shown on the tare beam.
"Add 7000 lb." to the net load shown on the dial.

After the operator has completed the weighing, he must remove all unit weights 27 from net load offsetting use before he can remove any unit weights from tare offsetting use. This prevents a new weighing from being made when unit weights may be in net load offsetting use unnoticed by the operator. Means are provided for preventing unit weights from being removed from tare offsetting use until all unit weights are removed from net load offsetting use and the indicating device 62 indicates zero. Such means includes a trigger 127 mounted on a shoulder screw 128 attached to the stationary plate 64. When the conditioning lever 102 is in "Weigh" position 107 and when the slidable rack 83 is moved downward by the turning of the handle 37, a trigger operating pin 129 fixed to the rack moves away from contacting position with the trigger. This permits a coil spring 130, extending between the trigger 127 and the end 131 of the pin 126 remote from the coil spring 125 attached to the pin 126, to pivot the trigger about the axis of the shoulder screw 128 to a position where a hook 132 on the trigger cooperates with a protuberance 133 on the bracket 105 locking the conditioning lever 102 in "Weigh" position 107. The pin 129 is shown in trigger operating position in FIG. V and in a position away from the trigger in FIG. IX.

To remove the unit weights 27 from net load offsetting use, the operator cranks the handle 37 counterclockwise until the unit weight indicating device 62 indicates zero and the trigger operating pin 129 contacts the trigger 127. In such position, he can no longer easily turn the handle 37 counterclockwise. The pin 129 pivots the trigger about the axis of the shoulder screw 128 and the hook 132 assumes the position shown in FIG. V. He then may manipulate the unlocked conditioning lever 102 into "Tare" position 108 and he may then further turn the handle 37 counterclockwise to remove the remaining unit weights from tare offsetting use. Both of the unit weight indicating devices 61 and 62 then indicate zero.

The apparatus so far described provides for the selective coupling of the unit weight indicating devices to the unit weight operating mechanism, whereby one 61 of the devices indicates the amount of tare offset by unit weights 27 and the other 62 of the devices indicates the amount of net load offset by further unit weights. The apparatus may be easily modified, as illustrated in FIG. VIII, so that one of the unit weight indicating devices indicates the gross amount of both tare and net load offset by unit weights and the other of the indicating devices indicates the amount of net load offset by unit weights.

In the embodiment hereinbefore described, the slidable mounted rack 82 has a lower slot 86 which cooperates with a shoulder 134 (FIG. VI) on the shoulder screw 87, the shoulder 134 being wider than the thickness of the rack 82 so that the slide 66 and the end of the shoulder are drawn together by a nut 135 turned on the shoulder screw which permits the rack 82 to be slidable on the shoulder. It is to be understood that the slidable connections of the racks 82 and 83 are identical and, hence, FIG. VI which shows the slidable connections between the rack 83 and the slide 66 is also illustrative of the slidable connection between the rack 82 and the slide.

The apparatus may be easily modified by the addition of a washer 136 (see FIG. VIII) between the head of the shoulder screw 87 and the slidable rack 82. The washer 136 takes up enough room on the shoulder 134 of the shoulder screw so that the nut 135 draws the slide 66 and the rack 82 together fixing the rack to the slide instead of drawing the slide 66 and the end of the shoulder together permitting the rack 82 to be slidable on the shoulder, as shown in FIG. VI. In the modified apparatus, the slidable connection between the rack 83 and the slide 66 is unaltered. The rack 82 moves together at all times with the slide 66 so that the indicating device 61 indicates the gross amount of unit weights used in offsetting both tare and net weight. The washer 136, and the shoulder on the shoulder screw 87 provide means for permitting the optional use of the unit weight indicating devices 61 and 62 either to indicate on the device 61 the amount of tare offset by unit weights and on the device 62 the amount of net load offset by further unit weights (both racks 82 and 83 slidable on the slide 66—FIG. VI) or to indicate on the device 61 the gross amount of tare and net load offset by unit weights (rack 82 fixed to the slide 66 by means of the washer 136—FIG. VIII) and on the device 62 the amount of net load offset by unit weights (rack 83 slidable on the slide 66).

Another feature of the unit weight apparatus is a safety lock for the unit weight operating mechanism which is automatically actuated, in removing unit weights, when all of the unit weights are removed from net load offsetting use and it is time for the scale operator to throw the conditioning lever 102 into its "Tare" position 108. Because of the safety lock, the operator cannot operate the unit weight operating mechanism until he properly manipulates the conditioning lever 102. After he properly manipulates the lever, the lock automatically releases the unitweight operating mechanism and he is free to operate the mechanism to remove the rest of the unit weights. Heretofore, when all of the unit weights were removed from net load offsetting use and it was time for the scale operator to move the conditioning lever 102 into its "Tare" position 108 so that unit weights could be removed from tare offsetting use, the operator might inadvertently continue to turn the handle 37 of the unit weight operating mechanism without manipulating the conditioning lever. When all of the unit weights are removed from net load offsetting use the mechanism is positioned as shown in FIG. V with the head of the shoulder screw 85 at the bottom of the slot 84 in the slidable rack 83. In such position, the slidable rack 83 cannot be moved up further and should the operator try to turn the handle 37 further to remove more unit weights and, hence, transmit force to the slidable rack 83 through the pivotally mounted rack 69 the head of the shoulder screw 72 which connects the rack 69 to the slide 66 will be sheared off. The operator can do this quite easily because of the mechanical advantage through the gearing and leverage of the unit weight operating mechanism. The safety lock of the invention prevents this damage; it latches the unit weight operating mechanism by obstructing the counterclockwise movement, as viewed in FIG. V, of one or the other of a pair of pins 137, which protrude axially from a hub 138 on the handle 37 and which are 180 degrees apart, by means of a lock finger 139. The lock finger 139 is shown obstructing the counterclockwise movement of the hub 138 in FIG. V.

The safety lock includes a yoke support bracket 140 which has a flat-bottomed U shape and which is fixed to the shaft 103, the bracket 140 extending from point A to about point B on the shaft 103 (FIG. VI). Hence, the yoke support bracket 140 is rockable about the axis of the shaft 103 when the conditioning lever 102 on the shaft is moved. A pair of pins 141, one of which is shown in FIGS. V and VI, functions to pivotally mount a yoke 142 which as shown in FIG. V extends from the pins 141 to a position behind the U-shaped bracket 38. The yoke 142 itself is U-shaped, the bottom of the U being shown in FIG. IV. That one of the legs of the yoke 142 which can be seen in FIG. V defines a slot 143 which slidably receives a pin 144 carried by the upper end of the lock finger 139, the finger 139 being pivotally mounted on a stud 145 carried by the left hand leg of the U-shaped bracket 38 as viewed in FIG. IV. As viewed in FIG. V, the lock finger 139 is in front of the U-shaped bracket 38, the finger 139 being curved at its upper end as shown in FIG. IV to reach behind the leg of the U-shaped bracket 38 and cooperate with the yoke 142 which is inside the U-shaped bracket 38.

The unit weight mechanism is shown in FIG. V with no unit weights 27 in use and with the conditioning lever 102 in "Weigh" position 107 to engage the pivotally mounted rack 69 with the slidable rack 83, the yoke 142 being so held, by means of an L-shaped bracket 146 carried by the slidable rack 83, that the lock finger 139 is pivoted by the yoke about the axis of the stud 145 into its locked position wherein the finger obstructs the counterclockwise movement of one of the pins 137 on the hub 138 of the unit weight operating handle 37, the pin 144 carried by the upper end of the lock finger 139 moving to the right hand end of the slot 143 in the yoke 142 as viewed in FIG. V. The lock finger 139, however, does not prevent clockwise movement of the hub 138.

In operation, in order to use unit weights 27 to tare off load, the conditioning lever 102 is moved into is "Tare" position 108 to engage the pivotally mounted rack 68 with the slidable rack 82. This moves the yoke 142, operatively connected to the lever 102 through the bracket 140 on the shaft 103, and the lock finger 139 driven by the yoke 142 from their positions shown in solid lines in FIG. V and in broken lines in FIG. X to their positions shown in solid lines in FIG. X. As shown in solid lines in FIG. X, the free or right hand end of the yoke 142, instead of being supported on the bracket 146 as shown in FIG. V, is now supported by the stud 145 and the lock finger 139 no longer latches the hub 138 against counterclockwise movement, the pin 144 carried by the upper end of the lock finger 139 assuming a position near the left hand end of the slot 143 in the yoke 142. The operator then may use unit weights 27 to tare off load by cranking the handle 37 clockwise. Three 180 degree turns of the handle 37, for example, increases the tare offsetting ability of the scale by 3000 pounds and "3000" is displayed by the tare unit weight indicating device 61 as illustrated in FIG. IX.

In order to use unit weights 27 for net load offsetting use, the conditioning lever 102 is moved into its "Weigh" position 107 to engage the pivotally mounted rack 69 with the slidably mounted rack 83. This moves the yoke 142 and the lock finger 139 driven thereby from their positions shown in solid lines in FIG. X to their positions shown in broken lines in FIG. X and in solid lines in FIG. V. As shown in solid lines in FIG. V, the free or right hand end of the yoke 142 is now supported by the bracket 146 and the lock finger 139 prevents counterclockwise movement of the hub 138. The lock finger 139, however, does not prevent clockwise movement of the hub 138 so that unit weights for net load offsetting use can be added. The operator then may use the remaining unit weights to offset net load by cranking the handle 37 clockwise. As soon as the operator begins cranking the handle 37 clockwise, two things happen. The pin 129 fixed to the slidable rack 83 moves down away from the trigger 127 so that the coil spring 130 can pivot the trigger and lock the conditioning lever 102 in its "Weigh position 107" and the bracket 146 moves down away from the yoke 142 allowing the free or right hand end of the yoke 142 to fall on and be supported by the stud 145 as shown in FIG. IX. This unlocks the safety lock as shown in FIG. IX, the lock finger 139 no longer being in position to cooperate with one of the pins 137 on the hub 138 so that unit weights can be removed at any time.

To remove the unit weights 27, the handle 37 is turned counterclockwise until all of the unit weights are removed from net load offsetting use. The indicating device 62 then indicates zero. At this time, the pin 129 carried by the slidable rack 83 has pivoted the trigger 127 to unlock the conditioning lever 102 and the bracket 146 has moved the yoke 142 upwardly from its position shown in FIG. IX to its position shown in FIG. V. This locks the safety lock, the lock finger 139 being in position to cooperate with one of the pins 137 on the hub 138. The essence of the invention is in the locking of the unit weight operating mechanism at this step in the process. At this step, the operator is supposed to move the now unlocked conditioning lever 102 to its "Tare" position 108. Should he forget and attempt to turn the unit weight operating handle 37 counterclockwise further, he cannot. This prevents damage to the mechanism as hereinbefore described.

To remove the rest of the unit weights 27, the conditioning lever 102 is moved to its "Tare" position 108. This unlocks the safety lock as hereinbefore described and as shown in FIG. X. The operator is then free to turn the now unlocked unit weight operating handle 37 counterclockwise until the indicating device 61 indicates zero. This is the condition of the mechanism shown in FIG. V, i.e., FIG. V shows the mechanism as positioned when all of the unit weights 27 are removed from both tare and net load offsetting uses.

It will, of course, be understood that various details of construction may be varied over a wide range without departing from the principles of the invention, and it is therefore not the purpose to limit the patent granted hereon otherwise than necessitated by the scope of the appended claims.

Having described the invention, I claim:

1. In a weighing scale, in combination, means including unit weights for offsetting tare and net load, mechanism for positioning the unit weights to selectively change the load offsetting capacity of said means, a pair of indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and means, operative upon failure of the drive means to couple the coupling means to an indicating device, to automatically couple the coupling means to an indicating device, whereby a unit weight cannot be positioned to change the load offsetting capacity without effecting one of the unit weight indications when said failure occurs.

2. In a weighing scale, in combination, means including unit weights for offsetting tare and net load, mechanism for positioning the unit weights to selectively change the load offsetting capacity of said means, a pair of unit weight indicating devices, coupling means including a slidably mounted plate operatively connected to the mechanism and positioned thereby and pair of racks, one for each of the devices, carried by the plate and movable relative thereto, drive means for selectively coupling one or the other of the racks to its respective indicating device, whereby the devices are driven by the mechanism and one of the devices indicates the amount of tare offset by unit weights and the other one of the devices indicates the amount of net load offset by further unit weights, and means, operative upon failure of the drive means to couple a rack and thus the slidably mounted plate to an indicating device, to automatically couple a rack and thus the slidably mounted plate to an indicating device, whereby a unit weight cannot be positioned to change the load offsetting capacity without effecting one of the unit weight indications when said failure occurs.

3. In a weighing scale, in combination, means including unit weights for offsetting tare and net load, mechanism for positioning the unit weights to selectively change the load offsetting capacity of said means, a pair of unit weight indicating devices, coupling means including a slidably mounted plate operatively connected to the mechanism and positioned thereby and pair of racks, one for each of the devices, carried by the plate and movable relative thereto, drive means for selectively coupling one or the other of the racks to its respective indicating device, whereby the devices are driven by the mechanism and one of the devices indicates the amount of tare offset by unit weights and the other one of the devices indicates the amount of net load offset by further unit weights, and means, including a link connecting the racks and a spring that connects one of the racks and the plate and that is operative upon failure of the drive means to couple a rack and thus the slidably mounted plate to an indicating device, to automatically couple a rack and thus the slidably mounted plate to an indicating device, whereby a unit weight cannot be positioned to change the load offsetting capacity without effecting one of the unit weight indications when said failure occurs.

4. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a pair of unit weight indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and means, operative upon failure of the drive means to couple the coupling means to an indicating device, to automatically couple the coupling means to an indicating device, whereby a unit weight cannot be positioned to change the load offsetting capacity without effecting one of the unit weight indications when said failure occurs.

5. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a pair of unit weight indicating devices, coupling means including a slidably mounted plate operatively connected to the mechanism and positioned thereby and pair of racks, one for each of the devices, carried by the plate and movable relative thereto, and drive means for selectively coupling one or the other of the racks to its respective indicating device, whereby the devices are driven by the mechanism and one of the devices indicates the amount of tare offset by unit weights and the other one of the devices indicates the amount of net load offset by further unit weights, and means, operative upon failure of the drive means to couple a rack and thus the slidably mounted plate to an indicating device, to automatically couple a rack and thus the slidably mounted plate to an indicating device, whereby a unit weight cannot be positioned to change the load offsetting capacity without effecting one of the unit weight indications when said failure occurs.

6. In a weighing scale, in combination, means including unit weights for offsetting tare and net load, mechanism for positioning the unit weights to selectively change the load offsetting capacity of said means, a pair of indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, automatically engageable with the mechanism immediately after all of the unit weights have been removed from one of their load offsetting uses, for preventing further operation of the mechanism until the drive means is operated.

7. In a weighing scale, in combination, means including unit weights for offsetting tare and net load, mechanism for positioning the unit weights to selectively change the load offsetting capacity of said means, a pair of indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, automatically engageable with the mechanism immediately after all of the unit weights have been removed from net load offsetting use, for preventing further operation of the mechanism until the drive means is operated to couple the coupling means to the tare unit weight indicating device.

8. In a weighing scale, in combination, means including unit weights for offsetting tare and net load, mechanism for positioning the unit weights to selectively change the load offsetting capacity of said means, first and second indicating devices, coupling means operatively connected to the mechanism and to the first indicating device, drive means for selectively coupling the coupling means to the second indicating device, whereby the devices are driven by the mechanism and the first device indicates the gross amount of tare and net load offset by unit weights and the second device indicates the amount of net load offset by unit weights, and lock means, automatically engageable with the mechanism immediately after all of the unit weights have been removed from net load offsetting use, for preventing further operation of the mechanism until the drive means is operated to uncouple the coupling means from the net load unit weight indicating device.

9. In a weighing scale, in combination, means including unit weights for offsetting tare and net load, mechanism for positioning the unit weights to selectively change the load offsetting capacity of said means, a pair of indicating devices, coupling means operatively connected to the mechanism for coupling the indicating devices to the mechanism, drive means for selective coupling the coupling means to one or the other of the indicating devices, whereby the devices are driven by the mechanism and one of the devices indicates the amount of tare offset by unit weights and the other one of the devices indicates the amount of net load offset by further unit weights, and lock means, including a pivotally mounted latch finger operatively connected to the drive means and a member operatively connected to one of the indicating devices for pivoting the latch finger into a position of engagement with the mechanism immediately after all of the unit weights have been removed from the use corresponding to such one of the indicating devices, for preventing further operation of the mechanism until the drive means is operated.

10. In a weighing scale, in combination, means including unit weights for offsetting tare and net load, mechanism for positioning the unit weights to selectively change the load offsetting capacity of said means, a pair of indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, including a pivotally mounted latch finger operatively connected to the drive means and a member operatively connected to the net load unit weight indicating device for pivoting the latch finger into a position of engagement with the mechanism immediately after all of the unit weights have been removed from net load offsetting use, for preventing further operation of the mechanism until the drive means is operated to couple the coupling means to the tare unit weight indicating device.

11. In a weighing scale, in combination, means including unit weights for offsetting tare and net load, mechanism for positioning the unit weights to selectively change the load offsetting capacity of said means, first and second indicating devices, coupling means operatively connected to the mechanism and to the first indicating device, drive means for selectively coupling the coupling means to the second indicating device, whereby the devices are driven by the mechanism and the first device indicates the gross amount of tare and net load offset by unit weights and the second device indicates the amount of net load offset by unit weights, and lock means, including a pivotally mounted latch finger operatively connected to the drive means and a member operatively connected to the net load unit weight indicating device for pivoting the latch finger into a position of engagement with the mechanism immediately after all of the unit weights have been removed from net load offsetting use, for preventing further operation of the mechanism until the drive means is operated to uncouple the coupling means from the net load unit weight indicating device.

12. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a pair of unit weight indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, automatically engageable with the mechanism immediately after all of the unit weights have been removed from one of their load offsetting uses, for preventing further operation of the mechanism until the drive means is operated.

13. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a pair of unit weight indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, automatically engageable with the mechanism immediately after all of the unit weights have been removed from net load offsetting use, for preventing further operation of the mechanism until the drive means is operated to couple the coupling means to the tare unit weight indicating device.

14. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, first and second indicating devices, coupling means operatively connected to the mechanism and to the first indicating device, drive means for selectively coupling the coupling means to the second indicating device, whereby the devices are driven by the mechanism and the first device indicates the gross amount of tare and net load offset by unit weights and the second device indicates the amount of net load offset by unit weights, and lock means, automatically engageable with the mechanism immediately after all of the unit weights have been removed from net load offsetting use, for preventing further operation of the mechanism until the drive means is operated to uncouple the coupling means from the net load unit weight indicating device.

15. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a pair of unit weight indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, including a pivotally mounted latch finger operatively connected to the drive means and a member operatively connected to one of the indicating devices for pivoting the latch finger into a position of engagement with the mechanism immediately after all of the unit weights have been removed from the use corresponding to such one of the indicating devices, for preventing further operation of the mechanism until the drive means is operated.

16. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, a pair of unit weight indicating devices, coupling means operatively connected to the mechanism for coupling the indicating devices to the mechanism, drive means for selectively coupling the coupling means to one or the other of the indicating devices, whereby the devices are driven by the mechanism and one of the devices indicates the amount of tare offset by unit weights and the other one of the devices indicates the amount of net load offset by further unit weights, and lock means, including a pivotally mounted latch finger operatively connected to the drive means and a member operatively connected to the net load unit weight indicating device for pivoting the latch finger into a position of engagement with the mechanism immediately after all the unit weights have been removed from net load offsetting use, for preventing further operation of the mechanism until the drive means is operated to couple the coupling means to the tare unit weight indicating device.

17. In a weighing scale, in combination, a pivotally mounted tare beam lever, means for transmitting tare and net load force to the lever, auxiliary load counterbalancing means which includes a plurality of unit weights for increasing the total load offsetting capacity of the scale, unit weight operating mechanism for so placing the unit weights on the tare beam lever that at least part of said tare and net load force may be offset, whereby the load offsetting capacity of said counterbalancing means may be changed selectively, first and second indicating devices, coupling means operatively connected to the mechanism and to the first indicating device, drive means for selectively coupling the coupling means to the second indicating device, whereby the devices are driven by the mechanism and the first device indicates the gross amount of tare are net load offset by unit weights and the second device indicates the amount of net load offset by unit weights, and lock means, including a pivotally mounted latch finger operatively connected to the drive means and a member operatively connected to the net load unit weight indicating device for pivoting the latch finger into a position of engagement with the mechanism immediately after all of the unit weights have been removed from net load offsetting use, for preventing further operation of the mechanism until the drive means is operated to uncouple the coupling means from the net load unit weight indicating device.

References Cited in the file of this patent

UNITED STATES PATENTS 2,851,262    Hoffmanns _____ Sept. 9, 1958

UNITED STATES PATENT OFFICE
CERTIFICATE OF CORRECTION

Patent No. 3,081,834                  March 19, 1963

Herbert D. Braun

It is hereby certified that error appears in the above numbered patent requiring correction and that the said Letters Patent should read as corrected below.

Column 1, line 56, strike out "loaded tow-motor trucks or other objects having a tare"; column 16, line 74, for "are" read -- and --.

Signed and sealed this 23rd day of June 1964.

(SEAL)
Attest:

ERNEST W. SWIDER                  EDWARD J. BRENNER
Attesting Officer                  Commissioner of Patents